Figure 1:
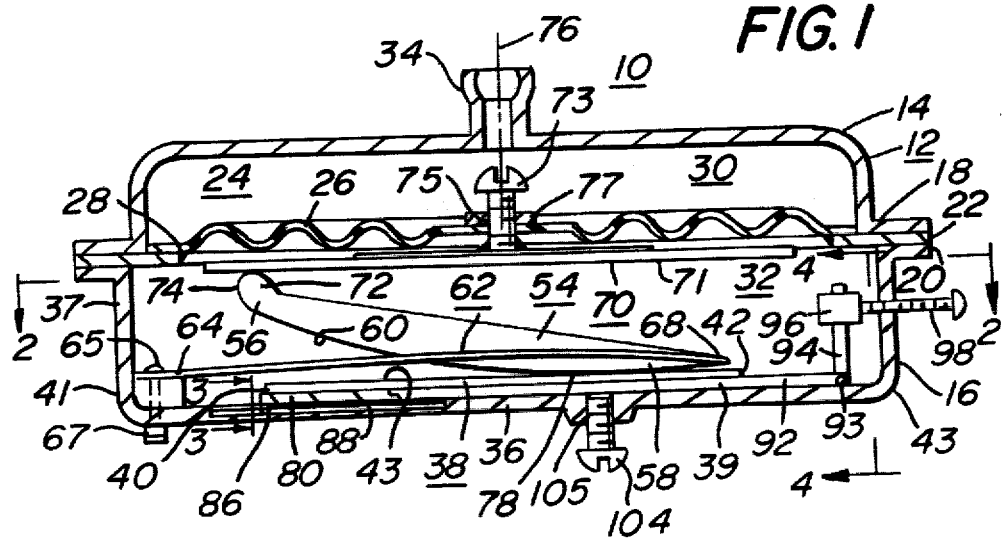

United States Patent [19]

Merz et al.

[11] 4,309,689
[45] Jan. 5, 1982

[54] SIGNAL TRANSDUCING UNIT

[75] Inventors: Kenneth M. Merz, Gladwyne; Laurence N. Wesson, Collegeville, both of Pa.

[73] Assignee: TRW, Inc., Cleveland, Ohio

[21] Appl. No.: 99,407

[22] Filed: Dec. 3, 1979

[51] Int. Cl.³ .............................................. H01L 10/10
[52] U.S. Cl. ..................................... 338/42; 338/155
[58] Field of Search ....................... 338/36, 41, 42, 68, 338/155; 73/719, 725

[56] References Cited

U.S. PATENT DOCUMENTS

| | | | |
|---|---|---|---|
| 2,244,958 | 6/1941 | Moross | 338/155 X |
| 2,286,717 | 6/1942 | Clason | 338/42 |
| 2,867,769 | 1/1959 | Hunt et al. | 338/42 X |
| 2,915,725 | 12/1959 | Colt et al. | 338/41 |
| 3,030,598 | 4/1962 | Cerny et al. | 338/155 X |
| 3,757,265 | 9/1973 | Russell | 338/41 X |
| 4,214,225 | 7/1980 | Wesson | 338/42 X |
| 4,220,943 | 9/1980 | Wesson et al. | 338/42 |

*Primary Examiner*—C. L. Albritton
*Attorney, Agent, or Firm*—Jacob Trachtman

[57] ABSTRACT

A signal transducing unit which is compact and can be calibrated from outside its housing to provide zero and span adjustments after assembly with the components secured within its housing. The device has a pair of first and second elements movable with respect to each other and each having first and second ends and a conductive path, and the conductive paths of the elements electrically contact each other at a location which is displaced along their paths with the relative movement of the elements. Positioning means retains the elements for relative movement, while actuating means displaceable for moving and positioning the first element with respect to the first element controls the contact location of the elements. Adjusting means controllably sets the positions of the elements with respect to each other for a given displacement of the actuating means for providing calibration, and connecting means electrically joins with the conductive paths of the first and second elements to provide an output signal determined by the position of one element with respect to the other.

29 Claims, 7 Drawing Figures

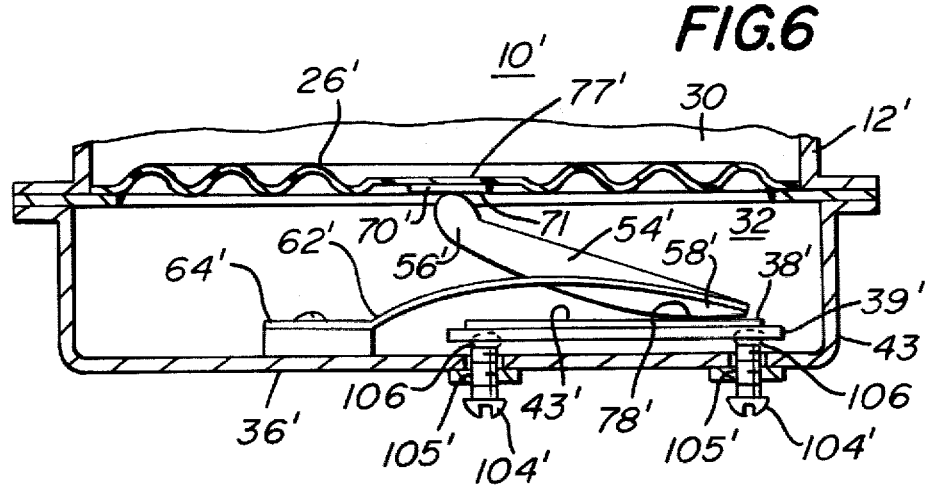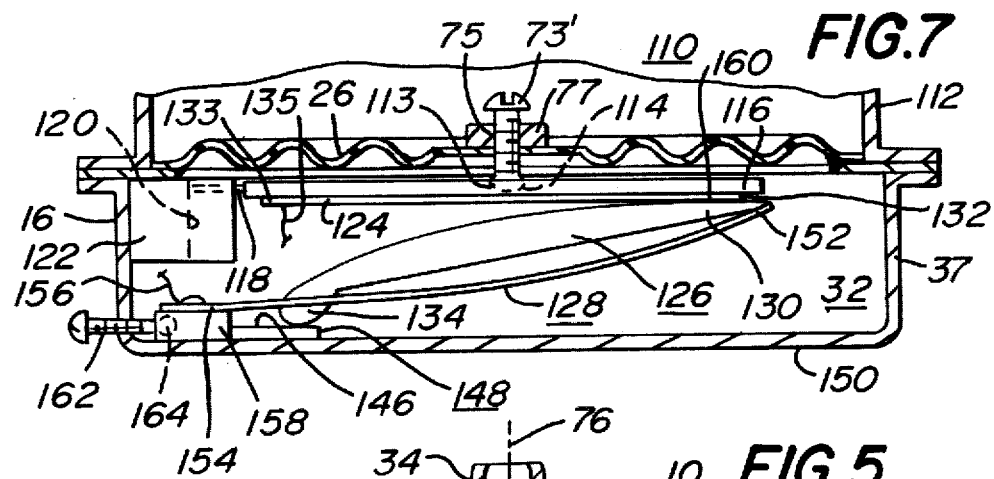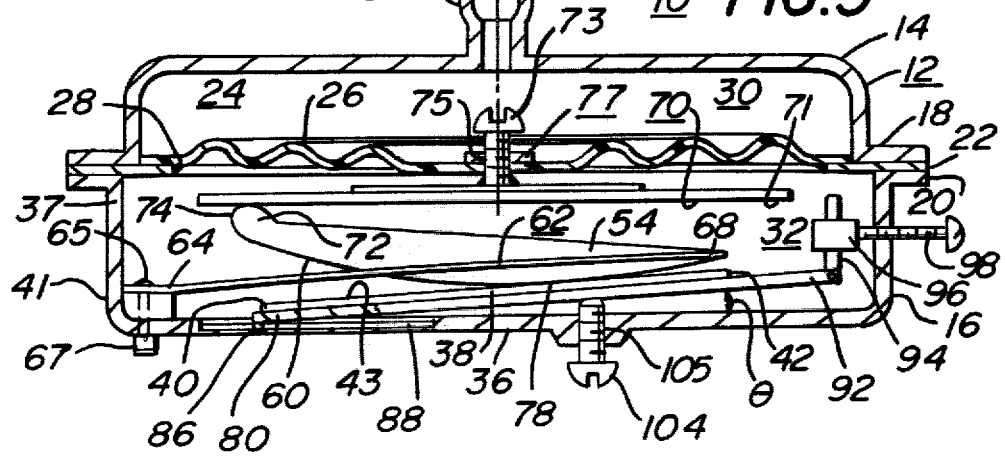

SIGNAL TRANSDUCING UNIT

The invention relates to a signal transducing unit, and more particularly to a unit which is mechanically actuated for producing an electrical output signal.

Signal transducing devices have been provided for producing electrical output signals in response to mechanical input signals. Such input signals may be provided by physical displacement, fluid pressure, or other such means which are to be measured or used for control purposes. In many instances, such transducers are required to operate in various positions and altitudes and under rigorous conditions. For many applications it is necessary that they be produced in small and miniature forms for providing highly accurate output signals. Although such a transducer has heretofore been disclosed as seen in U.S. Patent Application Ser. No. 972,864 filed Dec. 26, 1978 by Laurence N. Wesson et al entitled Signal Transducing Apparatus, it is desirable to provide a transducer of still greater compactness and accuracy and which can be precisely calibrated while assembled in its housing.

It is therefore a principal object of the invention to provide a new and improved signal transducing unit for providing electrical output signals for input signals in the form of mechanical displacements, fluid pressure, and by other such means.

Another object of the invention is to provide a new and improved signal transducing unit which provides highly accurate output signals corresponding in a predetermined manner to the input signals and which can be calibrated by providing zero and span adjustments after assembly and while secured within its housing.

Another object of the invention is to provide a new and improved signal transducing unit which may be made in a highly reduced and miniature form for giving accurate output signals in response to the input signals.

Another object of the invention is to provide a new and improved signal transducing unit which is operable in any position and under various conditions for providing reliable and accurate output signals.

Another object of the invention is to provide a new and improved signal transducing unit of simple construction which can be hermetically sealed and is highly reliable in operation.

Another object of the invention is to provide a new and improved signal transducing unit which is rugged and may be easily and inexpensively produced.

The above objects as well as many other objects of the invention are achieved by providing a signal transducing unit comprising a resistor element and a rocker element which are movable with respect to each other. Each element has first and second ends and a conductive path extending respectively along its element, and they are positioned with their respective ends and paths opposite to each other. The conductive paths of the elements electrically contact each other at a location which is displaceable along the paths of the elements responsive to their relative positions. The rocker element has an arcuate surface providing its conductive path and moves by rocking action of its arcuate surface with respect to the other element for controlling the contact location along the paths of the elements.

An elongated flat spring unit which is slightly bowed extends along the second element and urges the second end of the second element in a predetermined direction towards the first element, while urging the first end of the second element in a direction away from the first element. An actuating means controls the position of the second element with respect to the first element by moving the second end of the second element in a direction opposite to the direction in which it is urged by the spring unit. Connecting means are joined electrically with the conductive paths of the first and second elements for providing output signals which are determined by the position of one element with respect to the other.

The resistor and rocker elements and the spring unit are received into a hermetically sealed chamber of a housing which is partitioned by a diaphragm to provide another chamber which is adapted for receiving fluid under pressure for deflecting the diaphragm. The diaphragm has a central actuating portion with a flat surface which is movable with deflection of the diaphragm along a line perpendicular to the resistor element to provide the actuating means which engages and positions the rocker element. In another form the central portion of the diaphragm is secured with a rigid plate which is spaced from and extends under the diaphragm for movement with the diaphragm for engaging the rocker element. In this form the resistor element may also be supported by the plate for engagement with the rocker element along their paths. The resistor element receives a voltage signal across it through the connecting means, while the rocker element which is electrically highly conductive delivers an output signal through the connecting means responsive to its contact location along the resistor element.

In the form in which the signal transducing unit has a rigid plate secured under the diaphragm for movement with the diaphragm, a more compact device may be provided for achieving the same degree of accuracy of output signals, as provided by the unit in which the rocker element has its first end engaged by the central actuating portion of the diaphragm. Because the rocker element extends beyond the central portion of the diaphragm, in this form, it may be arranged within the housing across a substantial portion of the housing diameter to engage the rigid plate at an off center or peripheral location. This allows a greater relative size for both the rocker element and the resistor element for the same size housing or allows the use of a more compact housing for the same size elements. Thus, either greater accuracy for the same size unit or the same accuracy with reduced size housing may be achieved by utilization of this form of the invention.

In order to obtain desired accuracy the unit must be calibrated for providing a desired output signal level for a given actuation of the diaphragm or zero point signal, and also a desired span for the output signals, that is a desired slope or ratio of increase in output signal to increase in input signal. Such calibration is achieved by threaded means operable from outside the housing which adjusts the positions of the resistor element and rocker element with respect to each other and with respect to the direction of their actuation by a given deflection of the diaphragm. This is achieved by adjusting the spacing of the actuating plate with respect to the diaphragm when such an actuating plate is utilized, or moving the resistor element or rocker element horizontally or angularly with respect to each other. After calibrating and setting the relative positions of the adjustable components of the signal transducing unit, the threaded means which may be pretinned may be heated to solder same in position for maintaining the said adjustments and providing an air seal to the chamber housing the resistor and rocker elements.

Figure 2:
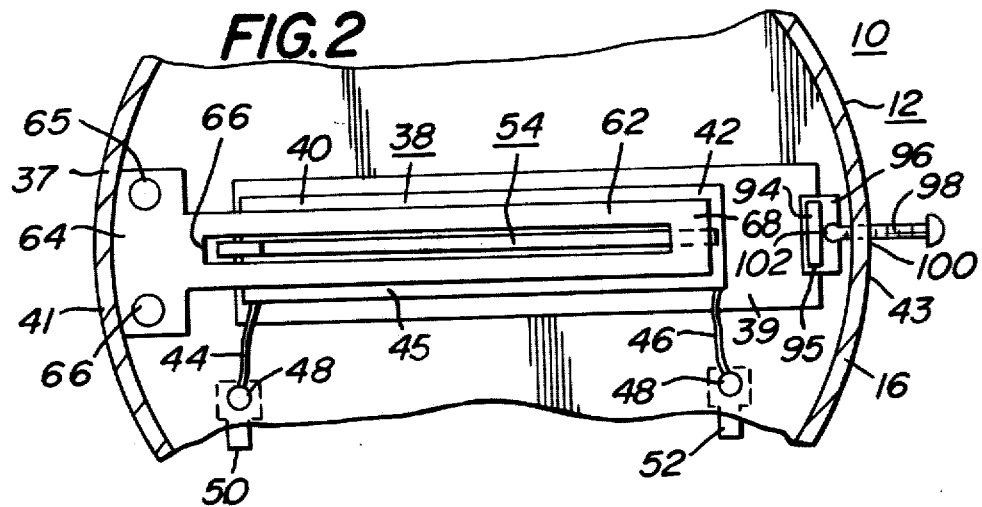
Figure 3:
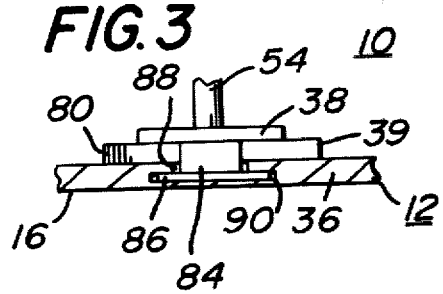
Figure 4:
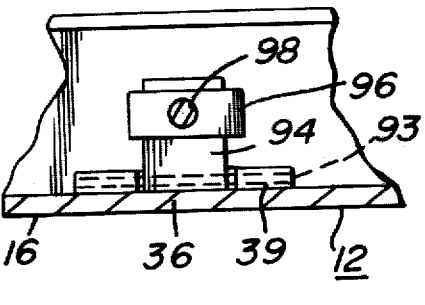

The foregoing and other objects of the invention will become more apparent as the following detailed description of the invention is read in conjunction with the drawing, in which:

FIG. 1 is a sectional view illustrating a signal transducing unit embodying the invention, FIG. 2 is a plan view with portions broken away taken on line 2—2 of FIG. 1, FIGS. 3 and 4 are enlarged fragmentary sectional views respectively taken on the lines 3—3 and 4—4 of FIG. 1, illustrating in detail adjusting means for calibrating the output signal of the unit, FIG. 5 is a view similar to that of FIG. 1 showing the unit with the diaphragm deflected and a changed setting of the adjusting means, FIG. 6 is a sectional view of a modified form of the signal transducing unit illustrated in FIG. 1 with the top portion broken away, and FIG. 7 is a sectional view similar to that of FIG. 5 of a signal transducing unit which is a modified form of the unit illustrated in FIG. 1.

Like reference numerals designate like parts throughout the several views.

FIGS. 1 to 5 illustrate a signal transducing unit 10 embodying the invention. The transducing unit 10 is contained in a housing 12 having upper and lower cup like portions 14 and 16 which may be made of metal and preferably a solderable metal. Circular outer flanges 18 and 20 of the top and bottom portions 14 and 16 of the housing 12 are secured, as by welding or other suitable means, on opposite sides of a ring 22 which may also be made of steel to form a cavity 24 within the housing. A flexible diaphragm 26 having a circular outer configuration and an undulating surface may be made of phosphor bronze and secured by welding along its outer edge at 28 to the inner edge of the ring 22. The diaphragm 26 partitions the cavity 24 into an upper chamber 30 and a lower chamber 32. The upper chamber 30 is provided with a central inlet port 34 for receiving fluid under pressure, while the lower chamber 32 may be evacuated and hermetically sealed in a final assembly step.

An elongated resistor element 38 is secured on the top surface of a base plate 39 which is slidably supported on the horizontal bottom wall 36 of the lower portion 16 of the housing 12. The resistor element 38 is diametrically positioned on the top surface of the wall 36 which has a circular periphery with its first end 40 extending radially towards the peripheral margin 41 of the wall 36 while its other end 42 extends radially towards its opposite peripheral margin 43. The resistor element 38, thus, extended over most of the diametric length of the wall 36 of the housing 12 toward the vertical side wall 37. The resistor element 38 may be of the wire wound, composition, enamel glaze or other type having a flat top surface 45 with an electrical contact path 43 along a line between its ends. The resistor element 38 provides increasing resistance when measured between one of its ends and a contact location which moves along the path 43 towards its other end. The ends 40 and 42 of the resistor 38 are respectively connected by conductors 44 and 46 to respective conductive rivets 48 which are electrically insulated from and extend through openings in the wall 36 to external electrical terminals 50, and 52. The resistor element 38 and base plate 39 are separated and insulated by a non conductive coating, and terminals 50, 52 are electrically insulated from the bottom wall 36 by the application of an insulating coating to the region of its inner and outer surfaces and the openings, or in any other suitable manner.

An elongated rocker element 54 having first and second ends 56 and 58 is made of a rigid highly conductive material with an arcuate bottom edge or surface 60 which may be non circular in configuration. The rocker element 54 is retained by an elongated flexible metal spring unit 62 so that it is positioned opposite to and along the resistor element 38 with its first and second ends 56, 58 positioned approximately opposite to the first and second ends 40, 42 of the resistor element 38. The bottom surface 60 of the rocker element 58 electrically contacts the resistor element 38 at a location 78 along the line of its path 43 on the flat upper surface of the resistor 38. The contact location 78 is determined by the relative position of the rocker element 54 with respect to the resistor element 38.

The spring unit 62 which may be made of a highly flexible and resilient material has a terminal end 64 which is electrically insulated from and secured by rivets 65 with the inner surface of the bottom wall 36 close to the end 40 of the resistor element 38. The terminal end 64 is also electrically connected by a rivet 65 with a signal output terminal 67 which is externally retained by and insultated from the housing 12. The spring unit 62 extends over the first end 40 of the resistor element 38 and toward its second end 42. The spring unit 62 is also provided with an elongated opening 66 within which the rocker element 54 is received for being retained against lateral displacement. The extending end 68 of the spring unit 62 fits into a notch in the upper edge of the second end 58 of the rocker element 54, and is securely joined with the rocker element 54 by welding, soldering or other such means. The end 68 of the spring unit 62 urges the second end 58 of the rocker element 54 in a downward direction towards the second end 42 of the resistor element 38. At the same time, the end 68 of the spring unit 62 also exerts a clockwise torque on the rocker element 54 urging its first end 56 in the clockwise direction. The downward force exerted on the end 68 by the spring unit 62 is of sufficient magnitude with respect to the torque which it applies to the element 54, so that its second end 58 is positioned proximate to the second end 42 of the resistor element 38 as shown in FIG. 1 and its first end 56 extends upwardly, in the absence of force applied to the rocker element 54 by the downward displacement of the diaphragm 26. In this position, the first end 56 of the rocker element 54 is in contact with the bottom flat surface 71 of an actuating plate 70 within the chamber 32 which is secured for movement with the diaphragm 26 by an adjusting screw 73. The screw 73 has a slotted head which is located within the chamber 30 and threadedly engages a reinforced opening 75 in the central region 77 of the diaphragm 26 to extend into the chamber 32 with its extending end secured as by welding with the central region of the plate 70. The actuating plate 70 has a diameter substantially equal to that of the diaphragm 26 and is adjustably spaced from the diaphragm 26 by rotation of the screw 73 by means of an implement received through the inlet port 34 to engage its slotted head. The flat surface 71 of the plate 70 provides a plane smooth contacting surface, while the end 56 of the rocker element 54 has an upstanding portion 72 with a smooth arcuate contact edge or surface 74 for engagement therewith.

In operation, when fluid pressure is absent from the upper chamber 30 of the signal transducing device 10, the diaphragm 26 is in a substantially horizontal position as illustrated in FIG. 1. In this case, the spring unit 62 positions the rocker element 54 so that its second end 58 is proximate to the second end 42 of the resistor element 38, while its other first end 56 is displaced upwardly, away from the resistor first end 40, and in contact with surface 71 of the actuating plate 70 of the diaphragm 26. With an increase in fluid pressure delivered through the port 34 to the chamber 30, the diaphragm 26 is deflected downwardly resulting in the downward movement of the plate 70 along its vertical axis 76. With this movement, the plate 70 exerts a downward force on the first end 56 of the rocker element 54 at its point of contact with the arcuate surface 74 of its upright extending portion 72. This provides a rocking motion to the element 54 raising the second end 58 and moving the location 78 of contact between the arcuate surface 60 and the path 43 of the resistor 38 along the linear path 43. The contact location 78 moves in the direction toward the first end 40 of the resistor element 38 and the first end 56 of the rocker body 54. The elongated spring unit 62 which extends along the rocker element 54 with an arcuate configuration and a length corresponding to the length of the arcuate bottom edge 60 of the rocker element 54, is only slightly deflected for readily permitting the rocking movement of the element 54, and minimizes slipping of the rocker contact surface 60 with respect to the surface 45 of the resistor element 38. The rocking action of the element 54 is illustrated by the respective end positions of the rocker element 54 in FIG. 1 for no deflection of the diaphragm 26, and in FIG. 5 for greater deflection of the diaphragm 26. The clockwise torque applied by the spring unit 62 at the second end 58 of the rocker element 54 is effective for maintaining such contact pressure even when the downward force applied by the plate 70 is minimal as when the diaphragm is in its undeflected position. This torque force also acts to maintain good contact and reliable operation for various orientations or positions of the signal transducing device 10.

Thus, when positioned by the deflection of the diaphragm 26 and plate 70, the rocker element 54 under the action of the spring unit 62, makes contact with the resistor element 38 at a location 78 along the path 43 between its ends 40 and 42. With the application of a voltage between the terminals 50 and 52, a voltage appears across the ends 40, 42 of the resistor element 38, and voltage signals are provided at respective locations along the path 43 between the resistor ends 40, 42 corresponding to the voltage drop produced at these locations. The voltage signal at the contact location is delivered through the conductive rocker element 54 to the end 68 of the spring unit 62, and through the conductive spring 62 and rivet 65 to the external terminal 67. At terminal 67, the voltage signal may be measured with respect to the voltage potential provided at either of the external terminals 50 and 52. In the manner described, an output voltage signal is provided at the output terminals which varies with the displacement of the contact location 78 along the path 43 of the resistor element 38. Since the contact location 78 is a function of the position of the rocker body 54 which is controlled by the deflection of the diaphragm 26, the signal transducing device 10 provides an electrical output signal which is responsive to the deflection of the diaphragm 26 caused by the fluid pressure provided to the upper chamber 30 of the housing 12.

Because of the elongated configuration of the rocker element 54 as seen in FIGS. 1 and 5, and the extent of the path 43 along which it contacts the the resistor 38, the construction of the signal transducing device 10 allows large displacements of the contact location 78 between the elements 38 and 54 for relatively smaller displacements of the diaphragm 26 and plate 70. This amplification greatly increases the accuracy with which output signals are provided responsive to small input displacements to the signal transducing device 10. Since the invention provides for the resistor element 38 to extend over a greater portion of the diameter of the wall 36 of the housing 12, the signal transducing unit 10 achieves a structure of greatly reduced and miniature form while still providing accurate output signals.

It is noted that the functional relationship between the output to input signals of the signal transducing device depends upon a number of factors. One of these factors is the relationship between the displacement of the contact location 78 between the elements 38 and 54 to the displacement of the contact plate 70 of the diaphragm 26. Another is the variation of resistance along the contact path 43 of the resistor element 38. Thus, if a linear relationship is maintained between the displacement of the contact location 78 with displacement of the diaphragm 26 and plate 70, and the resistance varies linearly from one end to the other along the path 43 of the resistor 38, a linear response will be obtained between the input and output signals. The manner of obtaining such a linear relationship is disclosed in the U.S. Patent Application Ser. No. 972,874 filed Dec. 26, 1978 by Laurence N. Wesson entitled Signal Transducing Device. Similarly, with other relationships between the components of the device, other desired linear and non linear functions can be achieved.

The utilization of the enlarged disc or plate 70 for actuating the end 56 of the rocker element 54, allows the signal transducing unit 10 to provide more accurate output signals, since for the same housing size the resistor and rocker elements 38 and 54 may be lengthened to extend across a substantial portion of the diameter between opposite peripheral margins 41, 43 of the wall 36. This is due to the fact that with the rigid plate 70, the end 56 of the rocker element 54 may be positioned off center with respect to the center of the diaphragm 26 for receiving actuation. This may result in the increase in length of the element 38 and 70 by a factor of 2. Since the plate 70 may be made of a thin light weight material, the responsiveness of the diaphragm 26 will be effected only slightly by the increased mass. Thus, the output signal provided will still accurately follow rapid changes in input signals while providing the advantages noted above.

In order to obtain desired accuracy for the signal transducing unit 10, especially where output signals of predetermined amplitudes are required for given input signals, calibration of the unit 10 is essential. In the production of signal transducing units of reduced or miniature form, it is desirable, if not essential that the units be calibrated after all the components have been assembled without requiring the removal and reassembly of components for achieving the desired calibration. It is also desirable that the adjustments be made and set from outside of the housing 12 and that the housing 12 be sealable after calibration to allow the chamber 32 to be evacuated if desirable.

For the purpose of providing a zero point calibration for the device 10 in which a given input signal provides a predetermined output signal, the spacing of the plate 70 attached to the diaphragm 26 is adjusted by rotation of the screw 73 in the direction for lowering or raising the plate 70 with respect to the diaphragm 26. If the output signal is to be adjusted for atmospheric pressure, then the screw 73 is rotated until the desired output signal is achieved. Thus, with the lowering of the plate 70, the end 56 of the rocker element 54 moves downwardly towards the end 40 of the resistor element 38 moving the contact point 78 along the path 43 of the resistor element 38 towards its end 40 for effecting the output voltage. Turning the screw 73 to raise the plate 70 moves the contact point 78 in the direction towards the end 42 of the resistor element 38 for changing the output voltage in the opposite direction. If the output voltage is to be adjusted for a particular applied fluid pressure to the upper chamber 30, the same procedure is carried out, except that the adjustment of the screw 73 is made each time after the pressure through the central inlet port 34 is removed, until the desired output voltage is obtained. In order to obtain a hermetic seal for the chamber 32, the screw 73 may be tinned, so that when heat is applied to the screw 73, the solder on the threaded portion will melt providing a soldered joint fixing the adjustment and preventing fluid leakage through the opening 75 in the central region 77 of the diaphragm 26.

Under certain circumstances, it may be desirable to non adjustably secure the actuating plate 70 with the central region 77 of the diaphragm 26. In such a case, the plate 70 may be secured by any known desirable means to provide the enlarged surface 71 allowing the contacting and actuation of the rocker element 54 at a location off center from the center region 77 of the diaphragm 26, to provide the advantages noted above.

The signal transducing unit 10 illustrated includes other adjustment means for setting the zero point or output voltage for a predetermined input signal, and also for adjusting the span or rate at which the output signal changes with change in the input signal. Such adjustment means may be used in addition to or independently of the adjustments provided by the actuating plate 70.

The base plate 39 which supports the resistor element 38 is slideably mounted on the inside upper surface of the bottom wall 36 of the housing 12 as clearly shown in FIGS. 1 and 3. The end 80 of the plate 39 has a downwardly extending portion 84 which supports a horizontally extending pin 86. The portion 84 extends into a slot 88 in the wall 36 extending under the plate 39 having an undercut portion 90 receiving the ends of the pin 86. This structure permits guided longitudinal sliding movement of the base plate 39 in the direction of the path 43 of the resistor element 38. The pin 86 which has ends entending into the undercut portion 90 of the slot, also permits pivotal motion about the end 80 of the base plate 39. The opposite end 92 of the base plate 39 is hingedly secured by a pin 93 with an upstanding portion 94 which is slidably received through a closely fitted rectangular opening 95 in a block member 96.

The block member 96 is positioned by a screw 98 which threadedly extends through an opening 100 in the vertical wall of the cup like portion 16 of the housing 12. The slotted head end of the screw 98 is external of the housing 12 while the end extending into the chamber 32 is rounded to provide a ball and socket joint 102 in the block member 96. Rotation of the screw 96 adjusts the horizontal position of the block member 96 and transmits a force through the vertical member 94 which it maintains in a vertical orientation, to the end 92 of the base plate 39. Thus, the extension and retraction of the screw 98 results in the sliding or horizontal movement of the base plate 39 away from or towards the peripheral margin 43 of the housing 12. The movement of the base plate 39 to the left results in the movement of the contact location 78 of the elements 38, 54 towards the end 42 of the resistor 38, while movement of the base plate 39 in the opposite direction, results in the movement of the contact location 78 along the path 43 in a direction towards the end 40 of the resistor 38. This movement allows adjustment and setting of the contact point 78 of the elements 38 and 54 for a given pressure applied to the diaphragm 26, thereby allowing the setting of the zero calibration point for the output signal.

For the purpose of adjusting the span or rate at which the output signal changes with changes in the input signal, the adjusting means of the signal transducing unit 10 provides a screw 104 which extends vertically and threadedly engages an opening 105 in the bottom wall 36 of the housing 12. The head end of the screw 104 has a slot to allow its rotation, while its other end extends into the chamber 32 and engages the bottom surface of the base plate 39 between its ends 80 and 92. Upward movement by rotation of the screw 104 causes its upper end to extend into the cavity 32 resulting in the pivotal movement of the base plate 36 about its pin 86 at its end 80 as shown in FIG. 5. Since the vertically retained upstanding end 94 is pivotally secured to the end 92 of the base plate 39, the upward pivotal movement of the base plate 39 results in its free extension through the opening 95 in the block member 96. Because the block member 96 retains the portion 94 in a vertical orientation, any horizontal displacement of the block member 96 by rotation of the screw member 98 still transmits horizontal movement to the base member 92 as described above.

The angular disposition of the base plate 39 by the screw 104 effects the span or rate at which the output signal varies in relation to the input signal. The greatest span is provided when the resistor element 38 is positioned horizontally as shown in FIG. 1. This is perpendicular to the vertical direction of the actuating motion provided by the diaphragm 26 and its actuating plate 70. With the increase in the angular disposition $\theta$ of the base plate 39 to the horizontal plane, the span of the output signal decreases as a function of the cosine of the angle. Thus, as the angular disposition of the base plate 39 increases, the span or ratio of change of the output signals to change of the input signals, decreases. By use of the screws 98 and 104 the relationship between the resistor element 38 and rocker element 54 may be set to provide the desired zero output signal and range. The adjustment of one of the two screws 98, 104, may require the readjustment of the other until the final desired calibration is obtained. As before, the screws 98, 104 may be tinned with solder, so that the application of sufficient heat to the screw bodies results in the melting of the solder and the formation of good solder joints. This, also provides a good hermetic seal allowing evacuation of the chamber 32 after the unit 10 is calibrated. The use of the externally actuated screws 98 and 104, which extend through the housing 12, allows highly accurate and precise calibration without removal and readjustment of the components after assembly. This arrangement avoids the need for removing, adjusting and then reassembling the components as has been required in the case of prior art devices, and allows the setting of the calibration adjustments once the final desired output signals are obtained.

FIG. 6 is a sectional view of a signal transducing unit 10' which is a modified form of the unit 10. Since the signal transducing unit 10' operates in a manner substantially similar to that of the unit 10, only the differences in structure and operation will be discussed in detail. The housing 12' of the unit 10' is divided into upper and lower chambers 30 and 32 by a diaphragm 26'0 which is similar to the diaphragm 26 of the unit 10, except that the diaphragm 26' is provided with a small button 70' at the bottom of its central region 77' having a smooth horizontal surface 71'. The rocker element 54' is of reduced elongation with respect to the rocker 54 of the unit 10, and its end 56' is positioned to contact the button 70'. The rocker element 54', thus has a length of less than one half of the diameter of the bottom wall 36' of lower chamber 32. The spring element 62' is accordingly of reduced size and has its termination end 64' positioned on the bottom wall 36' close to its center.

A base plate 39' which extends from approximately the center of the bottom wall 36' towards the peripheral portion 43' of the housing 12' supports on its surface a flat resistor element 38' which has a shortened length which corresponds to that of the rocker element 54'. The base plate 39' is supported at each of its ends by a screw 104' which threadedly engages and extends through reinforced openings 105' in the bottom wall 36' of the housing 12'. The bottom end of each of the screws 104' is provided with a slotted end while its upper end is rounded and fits into a respective socket 106 provided at opposite ends of the base plate 39'.

In operation, the upward parallel movement of the base plate 39' made by equally adjusting the screws 104' results in the upward displacement of the end 58' of the rocker 54' and the movement of the contact location 78' to the left along the path 43' between the ends of the resistor element 38'. This movement adjusts the zero calibration point or the output signal level for a given input signal to the device 10'. The span of the output signal is adjusted by changing the slope of the base plate 39' and resistor element 38' with respect to the horizontal plane of orientation. Thus, increasing the angle with respect to the horizontal orientation results in decreasing the span. After the desired calibration is achieved, the screws 104' which may be pretinned can be fixed and sealed in place by heating to form a good solder joints. The embodiment of FIG. 6, thus, provides a signal transducing unit 10' of high accuracy and rapid response to input signals, while allowing its calibration by adjustment of its components while assembled and in position within their housing.

FIG. 7 is a sectional view of a signal transducing unit 110 which is a modification of the unit 10 shown in FIG. 1. Because they are similar, only the differences in structure and operation of this device over that shown in FIG. 10 will be described in detail. The housing 112 of the transducing unit 110 is provided with the diaphragm 26 which receives through the opening 75 in its central reinforced portion 77, a screw element 73' which has a rounded bottom end 113 which is received within an intermediately positioned socket 114 of an elongated base plate 116. The rotation of the screw 73 adjusts the vertical position of the base member 116 with respect to the diaphragm 26. The elongated base plate 116 is provided with a thin extending portion 118 which is movable within a vertical slot 120 of a retaining structure 122. The retaining structure 122 is secured within the cavity 32 on a vertical side wall of the bottom cup 116 of the housing 112 under the peripheral portion of the diaphragm 26. By retaining the extending portion 118 within its slot 120, the structure 122 prevents rotation of the elongated base plate 116, while allowing its vertical movement by the adjustment of the screw 73'.

The base plate 116 has secured to its bottom surface an elongated flat resistor element 124 similar to the resistor element 38 of the unit 10. A rocker element 126 similar to the rocker element 54 of the unit 10, but inverted in orientation is supported by a spring unit 128 for contacting the resistor element 124. Thus, without the deflection of the diaphragm 26, the end 130 of the rocker element 126 engages and contacts the end 132 of the resistor element 124, while its rounded end 134 which extends downwardly, contacts a smooth upper surface 146 of a block 148 which slideably engages the top surface of the bottom wall 150 of the housing 112.

The spring unit 128 has its end 152 secured with the end 130 of the rocker unit 126 urging it in the upward direction, while its terminal end 154 is connected by a wire 156 to an output terminal 67' (not shown) and is secured as by a rivet or other means with the top surface of an enlarged portion 158 of the movable block 148. The end 152 of the spring unit 126 also exerts a counter clockwise torque on the rocker element 126 for maintaining its end 134 in contact with the top surface 146 of the block 148.

The signal transducing unit 110 operates in a manner similar to that of the unit 10 in which the contact location 160 between the resistor element 124 and the rocker element 126 is controlled by the deflection of the diaphragm 26 which is transmitted by the screw 73' to the base plate 116 and resistor element 124. The downward movement of the base plate 116 results in the rocking action of the rocker element 126 which moves in the clockwise direction about its end 134 resulting in the movement of the contact location 160 to the left along the path of the resistor 124 between its ends 132 and 133. Such change in contact location 160 results in an output signal communicated by the wire 156 electrically joined with the rocker 124 and the pair wires 135 respectively connected to the ends of the resistor element 124. The device 110, thus, illustrates a different or inverted arrangement of the resistance element 124 and rocker element 126 as compared to the structure of the unit 10, for providing a unit of high accuracy and reduced and miniaturized size.

The signal transducing unit 110 also provides the screw means 73' for adjusting and setting the calibration for the zero point output signal, by raising or lowering the base plate 116. Thus, with the lowering of the base plate 116 by the rotation of the screw 73', the output signal is adjusted by the rocking action of the rocker element 116 by moving the contact location 160 to the left towards the end 133 of the resistor element 124. Upon obtaining the desired output signal, the screw 73' may be fixed and sealed in a manner described above. The signal transducing unit 110 also illustrates another means for adjusting the calibration or zero output signal by utilizing a screw 62 which threadedly extends through the side wall into the chamber 32. The end of the screw 162 outside of the housing 112 has a slotted head for allowing its rotation, while its other end 164 is rounded for being received into a socket in the block 148. Rotation of the screw 162 causes the block 148 and spring unit 128 to move to the left or right resulting in corresponding horizontal movements of the rocker element 126 which is retained by the spring unit 128. This results in a corresponding shifting of the contact location 160 of the rocker 126 with the flat resistor element 124, and also acts to adjust the zero point or output signal level for the unit 110 for the undeflected state of the diaphragm 26, or alternatively for the application of any given pressure to the unit 110.

In considering the several embodiments disclosed, it will be obvious that the different structures and features shown may be interchanged and used in various combinations and that the several means for calibrating the devices may be used together or separately in the alternate embodiments for obtaining the desired results. Thus, the adjusting screws 104 and 104' for respectively adjusting the angular disposition of the base plates 39 and 39' of FIGS. 1 and 6 may be utilized without and apart from the other adjustments provided by the embodiments illustrated. Similarly the screws 98 and 162 of FIGS. 1 and 7, may be utilized respectively without the employment of the screws 73 and 73' in respective embodiments. It would also be obvious that the several structural means shown for carrying out the invention may be used in various combinations and may also be provided by other equivalent structures.

Although in the embodiments of the invention illustrated by the signal transducing units, the input signal is provided in the form of applied pressure to a deflectable diaphragm, it is noted that the invention is not limited to such means and that the input signals may be provided by other means and may take forms in which other parameters including linear and rotary motions and displacements may be utilized. The apparatus may also be used with more than one input signal, as in the case where differential pressures or forces are to be measured, detected or transformed into electrical output signals while providing the advantages of the invention.

While the invention has been described and embodiments, or forms, there will be obvious to those skilled in the art, many modifications and variations accomplishing the foregoing objects and realizing many or all of the advantages, but which yet do not depart essentially from the spirit of the invention.

What is claimed is:

1. A signal transducing unit comprising first and second elements movable with respect to each other and each having first and second ends and a conductive path, the conductive paths of the elements electrically contacting each other at a location which is displaced along their paths with the relative movement of the elements, positioning means for retaining the elements for relative movement, actuating means displaceable for moving and positioning the second element with respect to the first element and controlling the contact location of the elements, adjusting means secured with the actuating means for controllably setting the positions of the elements with respect to each other for a given displacement of the actuating means, and connecting means electrically joined with the conductive paths of the first and second elements for providing an output signal determined by the position of one element with respect to the other.

2. A signal transducing unit comprising first and second elements movable with respect to each other and each having first and second ends and a conductive path, the conductive paths of the elements electrically contacting each other at a location which is displaced along their paths with the relative movement of the elements, positioning means for retaining the elements for relative movement, actuating means displaceable for moving and positioning the second element with respect to the first element and controlling the contact location of the elements, adjusting means for controllably setting the positions of the elements with respect to each other for a given displacement of the actuating means, a support structure, the first element being mounted on the support structure for being adjustably secured by said adjusting means, and connecting means electrically joined with the conductive paths of the first and second elements for providing an output signal determined by the position of one element with respect to the other.

3. The unit of claim 2 in which the first and second elements are elongated and have their paths extending respectively along their elements with their respective first and second ends and paths opposite to each other, the second element includes an arcuate rocker surface providing its conductive path, and the second element moves by rocking action of its arcuate surface with respect to the first element for controlling the corresponding contact locations along the paths of the elements.

4. The unit of claim 3 in which the first element has a flat surface providing the conductive path for contacting the conductive path provided by the arcuate surface of the second element, and the positioning means includes a spring unit having a first end mounted on the support structure and a second end urging the second end of the second element in a direction which opposes the movement of the second element resulting from the displacement of the actuating means in the direction toward the second element and retains the second element for rocking movement over the flat surface of the first element.

5. The unit of claim 4 in which said support structure includes a housing having a cavity partitioned by a diaphragm member into first and second chambers, the first chamber is adapted for receiving fluid under pressure for deflecting the diaphragm, the second chamber receives the first and second elements and the spring unit of the positioning means, and the diaphragm member provides a actuating portion movable with the deflection of the diaphragm member to provide the actuating means for engaging the second element.

6. The unit of claim 5 in which the actuating portion of the actuating means is a flat plate positioned and spaced under the diaphragm member with a peripheral region proximate to the housing for engaging the first end of the second element.

7. The unit of claim 2, 3, 4, 5, or 6 in which the adjusting means includes a screw element threadedly engaging the support structure and having an extendable end for engaging and setting the position of the first element with respect to the housing.

8. The unit of claim 2, 3, 4, 5, or 6 in which one end of the first element is pivotally attached with the support structure and the adjusting means includes a screw element threadedly engaging the support structure and having an extendable end for moving the first element for adjusting and setting its angular position about its pivoted end.

9. The unit of claim 2, 3, 4, 5, or 6 in which the first element is slidably mounted on the support structure for horizontal movement and has one end pivotally secured to the support structure, and the adjusting means includes first and second screw elements each threadedly engaging the support structure and each having an extendable end for engaging and setting the position of the first element with respect to the support structure, the first screw element adjusting and setting the horizontal position while the second screw element adjusts and sets the angular position of the first element with respect to the support structure.

10. The unit of claim 2, 3, 4, 5, or 6 in which the adjusting means includes a pair of screw elements threadedly engaging the support structure and each having an extendable end respectively positioning the first and second ends of the first element for adjusting and setting the spacing and angular disposition of the first element with respect to the support structure.

11. The unit of claim 2, 3, 4, 5 or 6 in which the adjusting means includes a screw element threadedly engaging the support structure and having an extendable end for engaging and setting the position of the first element with respect to the housing, and the support structure is of a solderable material and the screw element is pretinned for being heated to provide a soldered joint securing and sealing same with the support structure.

12. The unit of claim 6 in which the diaphragm member has a central region with a threaded opening therethrough, and the adjusting means includes a screw element threadedly engaging the opening in the central region of the diaphragm member and having an end extending therethrough and engaging and supporting the plate of the actuating means, the screw element being rotatable for adjusting and setting the spacing of the plate with the diaphragm member and the engagement of the plate with the first end of the second element.

13. The unit of claim 1 which includes a support structure providing a housing having a cavity partitioned by a diaphragm member into first and second chambers, the first chamber is adapted for receiving fluid under pressure for deflecting the diaphragm member, the second chamber receives the first and second elements and the positioning means, and the diaphragm member has a central region movable with the deflection of the diaphragm member and providing the actuating means for moving the second element for positioning the elements with respect to each other.

14. The unit of claim 13 in which the diaphragm member has a central region and a peripheral region, the central region of the diaphragm member has a threaded opening therethrough, and the adjusting means includes a screw element threadedly engaging the opening in the central region of the diaphragm member and having an end extending therethrough for supporting the first element for movement together with the diaphragm member and for engaging and moving the second element, the screw element being rotatable for adjusting and setting the spacing of the first element with the diaphragm member and the positions of the first and second elements with respect to each other.

15. The unit of claim 13 in which the first and second elements are elongated and have their paths extending respectively along their elements with their respective first and second ends and paths opposite to each other, the second element includes an arcuate rocker surface providing its conductive path, and the second element moves by rocking action of its arcuate surface with respect to the first element for controlling the corresponding contact locations along the paths of the elements, and the first element has a flat surface providing the conductive path for contacting the conductive path provided by the arcuate surface of the second element.

16. The unit of claim 14 in which the first and second elements are elongated and have their paths extending respectively along their elements with their respective first and second ends and paths opposite to each other, the second element includes an arcuate rocker surface providing its conductive path, and the second element moves by rocking action of its arcuate surface with respect to the first element for controlling the corresponding contact locations along the paths of the elements, and the first element has a flat surface providing the conductive path for contacting the conductive path provided by the arcuate surface of the second element.

17. The unit of claim 15 or 16 in which the diaphragm member has a peripheral region and the ends of the first and second elements are opposite the peripheral region of the diaphragm member at diametrically spaced locations, the positioning means includes a spring unit having a first end mounted on the support structure and a second end urging the second end of the second element in the direction toward the diaphragm member and retains the second element for rocking movement over the flat surface of the first element.

18. The unit of claim 15 or 16 in which the positioning means includes a spring unit having a first end mounted on the support structure for being adjustably secured therewith, and a second end urging the second end of the second element in a direction which opposes the movement of the second element resulting from the displacement of the actuating means in the direction toward the second element and retains the second element for rocking movement over the surface of the first element, and the adjusting means includes a screw element threadedly engaging the support structure and having an extendable end for moving and positioning the first end of the spring unit with the support structure for adjusting and setting the position of the second element with respect to the first element.

19. A signal transducing unit comprising first and second elements movable with respect to each other and each having first and second ends and a conductive path, the conductive paths of the elements electrically contacting each other at a location which is displaced along their paths with the relative movement of the elements, positioning means for retaining the elements for relative movement, actuating means displaceable for moving and positioning the second element with respect to the first element and controlling the contact location of the elements, adjusting means for controllably setting the positions of the elements with respect to each other for a given displacement of the actuating means, a support structure, and connecting means electrically joined with the conductive paths of the first and second elements for providing an output signal determined by the position of one element with respect to the other, and in which the positioning means includes a spring unit having a first end mounted on the support structure for being adjustably secured therewith, and a second end urging the second end of the second element in a direction which opposes the movement of the second element resulting from the displacement of the actuating means in the direction toward the second element and retains the second element for movement over the surface of the first element, and the adjusting means includes a screw element threadedly engaging the support structure and having an extendable end for moving and positioning the first end of the spring unit with the support structure for adjusting and setting the position of the second element with respect to the first element.

20. The unit of claim 19 in which the support structure is of a solderable material and the screw element is pretinned for being heated to provide a soldered joint securing and sealing same with the support structure.

21. The unit of claim 12 or 14 in which the diaphragm member is of a solderable material and the screw element is pretinned for being heated to provide a soldered joint securing and sealing same with the opening in the diaphragm member.

22. A signal transducing unit comprising first and second elements movable with respect to each other and having first and second ends and a conductive path, the conductive paths of the elements electrically contacting each other at a location which is displaced along their paths with the relative movement of the elements, positioning means for retaining the elements for relative movement, actuating means displaceable for moving and positioning the second element with respect to the first element and controlling the contact location of the elements, a support structure including a housing having a side wall and a cavity partitioned by a diaphragm member into first and second chambers, the first chamber being adapted for receiving fluid under pressure for deflecting the diaphragm, the second chamber receiving the first and second elements and the positioning means, an actuating portion with an extending peripheral region proximate to the side wall of the housing secured for being movable with the deflection of the diaphragm member to provide the actuating means for engaging the first end of the second element at the peripheral region, and connecting means electrically joined with the conductive paths of the first and second elements for providing an output signal determined by the position of one element with respect to the other.

23. The unit of claim 22 in which the actuating portion movable with the diaphragm member is a flat plate positioned and spaced under the diaphragm member having a peripheral region proximate to the housing for engaging the first end of the second element.

24. The unit of claim 23 in which the first and second elements are elongated and have their paths extending respectively along their elements with their respective first and second ends and paths opposite to each other, the second element includes an arcuate rocker surface providing its conductive path, and the second element moves by rocking action of its arcuate surface with respect to the first element for controlling the corresponding contact locations along the paths of the elements, and the first element has a flat surface providing the conductive path for contacting the conductive path provided by the arcuate surface of the second element.

25. The unit of claim 24 in which the ends of the first and second elements are opposite the peripheral region of the plate at diametrically spaced locations, and the positioning means includes a spring unit having a first end mounted on the support structure and a second end urging the second end of the second element in the direction toward the diaphragm member and retains the second element for rocking movement over the flat surface of the first element.

26. A signal transducing unit comprising first and second elements movable with respect to each other and having first and second ends and a conductive path, the conductive paths of the elements electrically contacting each other at a location which is displaced along their paths with the relative movement of the elements, positioning means for retaining the elements for relative movement, actuating means displaceable for moving and positioning the second element with respect to the first element and controlling the contact location of the elements, a support structure providing a housing having a cavity partitioned by a diaphragm member into first and second chambers, the first chamber being adapted for receiving fluid under pressure for deflecting the diaphragm, the second chamber receiving the first and second elements and the positioning means, and the diaphragm member having a central region movable with the deflection of the diaphragm member and providing the actuating means for moving the first element to position the elements with respect to each other, attachment means securing the first element with the central region of the diaphragm member for movement therewith, and connecting means electrically joined with the conductive paths of the first and second elements for providing an output signal determined by the position of one element with respect to the other.

27. The unit of claim 26 in which the first and second elements are elongated and have their paths extending respectively along their elements with their respective first and second ends and paths opposite to each other, the second element includes an arcuate rocker surface providing its conductive path, and the second element moves by rocking action of its arcuate surface with respect to the first element for controlling the corresponding contact locations along the paths of the elements, and the first element has a flat surface providing the conductive path for contacting the conductive path provided by the arcuate surface of the second element.

28. The unit of claim 27 in which the positioning means includes a spring unit having a first end mounted on the support structure and a second end urging the second end of the second element in the direction toward the diaphragm member and the first end in the opposite direction and retains the second element for rocking movement over the flat surface of the first element while pivoting about the first end of the second element.

29. The unit of claim 25 or 28 which includes an adjusting means for controllably engaging and positioning the elements for calibrating the output signal.

* * * * *